United States Patent [19]
Russillo et al.

[11] Patent Number: 5,823,398
[45] Date of Patent: Oct. 20, 1998

[54] VALVE ASSEMBLY FOR DISPENSING CONDIMENTS

[76] Inventors: Rhonda L. Russillo; Donald Russillo, both of 1403 Boreas Dr., Orlando, Fla. 32822

[21] Appl. No.: 686,520

[22] Filed: Jul. 26, 1996

[51] Int. Cl.⁶ .................................................. B67D 5/06
[52] U.S. Cl. ..................................... 222/185.1; 222/361
[58] Field of Search ................................ 222/185.1, 361, 222/132

[56] References Cited

U.S. PATENT DOCUMENTS

| | | | |
|---|---|---|---|
| Re. 33,083 | 10/1989 | Pellegrino | 222/181 |
| 693,248 | 2/1902 | Einstein | 222/361 X |
| 1,313,174 | 8/1919 | Eisenhardt | 222/365 |
| 1,547,953 | 7/1925 | Palmer | 222/366 X |
| 1,574,813 | 3/1926 | Hafner | 222/361 X |
| 1,659,772 | 2/1928 | Hanson | 222/228 |
| 2,357,387 | 9/1944 | Dudley | 222/366 X |
| 3,731,851 | 5/1973 | Rauh | 222/365 X |
| 3,814,294 | 6/1974 | Stevenson | 222/181 |
| 4,266,695 | 5/1981 | Ruperez | 222/185 |
| 4,349,128 | 9/1982 | Sanfilippo | 222/166 |
| 4,569,463 | 2/1986 | Pellegrino | 222/187 |
| 4,674,660 | 6/1987 | Botto | 222/181 |
| 4,856,681 | 8/1989 | Murray | 222/158 |
| 5,009,345 | 4/1991 | McSweeney et al. | 222/556 |
| 5,138,979 | 8/1992 | Baird et al. | 222/365 X |
| 5,139,173 | 8/1992 | Evinger | 222/156 X |
| 5,437,396 | 8/1995 | Russillo et al. | 222/185.1 |

*Primary Examiner*—Gregory L. Huson
*Attorney, Agent, or Firm*—Brian S. Steinberger; Law Offices of Brian S. Steinberger

[57] ABSTRACT

Devices for dispensing condiments from a chamber. A push-valve extends from inside of the chamber through the bottom of the chamber. The valve has an up position which stores a preselected amount of the condiment, and a down position which dispenses the preselected amount of the condiment. The valve has an inner cylinder which slides within an outer cylinder. The inner cylinder has an indented area approximating a condiment teaspoon to be dispensed. The outer cylinder has a first hole located inside the chamber. The first hole is aligned with the indented area during the fill position. The outer cylinder has a second hole beneath the chamber so that the indented area is aligned with the second hole during the dispensing position. In the first embodiment, a plunger rod attached to the top of the inner cylinder has a spring wrapped around it. Depressing the plunger moves the inner cylinder from the fill to the dispensing position. A second embodiment has a manual lever mounted to the bottom of the inner cylinder which is actuated by moving the lever upward. Releasing this lever allows the inner cylinder to move to a dispensing position where the indented portion is aligned with the second hole. A third embodiment uses a forty-five degree angled through-hole passing from one side of the inner cylinder to the other side. The upper entrance to the through-hole allows the through-hole to be filled with condiments when aligned with the first hole inside the chamber. When the lower exit port of the through-hole is aligned with the second hole, condiments are dispensed. A fourth embodiment has a second through-holes below and parallel to a first through-hole. Moving the inner cylinder allows the contents of either one or two through-holes approximating one to two teaspoons/tablespoons/cups to be dispensed. Condiments include salt, pepper, tea, coffee, spices, garlic and sugar. O-rings can be inserted in the plunger for dispensing mustard, ketchup or cream. An attachment can scrape inner chamber walls. Plural dispensers can be mounted to dispense various condiments. The devices can be plastic, aluminum, stainless steel, and chrome plated.

19 Claims, 9 Drawing Sheets

VALVE ASSEMBLY FOR DISPENSING CONDIMENTS

This invention relates to a dispenser, and in particular to particular valve methods and apparatus for dispensing condiments such as sugar, salt, pepper, spices and the like. This invention relates to U.S. patent application 08/254,261 filed on Jun. 6, 1994 which was issued on Aug. 1, 1995 as U.S. Pat. No. 5,437,396 by the same inventors thereof, the subject matter of which is incorporated by reference.

BACKGROUND AND PRIOR ART

Past devices for dispensing condiments such as salt, pepper, and sugar have relied on shaker containers that require physically picking up and turning over a canister containing the condiment. These canister type shakers have numerous problems such as the lack of dispensing controlled amounts of the condiments, and the mess that may result from dispensing too much at one time. Both the commercial and home market have relied on these canisters.

Commercially, the most prevalent method of dispensing condiments in restaurants, and fast-food shops is utilizing packet paper containers. This technique can be both expensive in long term costs and environmentally wasteful since the used paper type packets must be thrown out. For example, 1,000 pounds of packet sugar is typically used by many stores such as fast-food restaurants in a given year. At $0.75 per pound, this translates into a cost of $750.00 per year. The industry average from pilfering and waste is approximately 25% of this total or $187 per year. From these numbers a restaurant supplying 1,000 pounds of sugar to their clients can cost approximately $937 per year. However, the base cost of bulk sugar at approximately $0.25 per pound for a yearly need of 1,000 pounds of sugar translates into a cost of only $250.00. From these numbers, the current distribution of sugar to restaurants adds almost $700 for every 1,000 pounds of sugar each year using paper packets.

Thus, the need exists for an inexpensive and efficient method for supplying condiments in both commercial business settings and in the home.

SUMMARY OF THE INVENTION

The first objective of the present invention is to provide an apparatus for dispensing condiments in preselected uniform amounts.

The second object of this invention is to provide an apparatus for dispensing condiments in a cost effective manner.

The third object of this invention is to provide an apparatus for dispensing condiments in an efficient manner.

The fourth object of this invention is to provide an apparatus for dispensing condiments in a nonwasteful manner.

The first embodiment comprises a chamber for storing a condiment, the chamber having sides and a bottom. A push-valve is located in the bottom of the chamber extending between the inside of the chamber through the bottom of the chamber. The valve having an up position and a down position, wherein the up position fills and stores a preselected amount of the condiment, and the down position dispenses the preselected amount of the condiment. The valve includes a solid inner cylinder with an indented area approximating a teaspoon of the condiment to be dispensed. The valve includes an outer hollow cylinder having an upper portion, a lower portion, and a middle portion with a smaller diameter located therebetween. The lower portion having two holes. A first hole is located near the bottom of the chamber for allowing the inner cylinder to slide therethrough. The first hole is aligned with the indented area during the fill position. The lower portion of the outer cylinder further includes a second hole located beneath the chamber so that when the indented area of the inner cylinder is aligned with the second hole during the dispensing position. A plunger rod has one end attached to a press-button and a second end attached to the top of the inner cylinder. The rod further includes an abutment means located near the middle and a spring wrapped around the rod between the abutment means and the narrow middle portion of the outer cylinder. The press-button when depressed by a user moves the inner valve from the fill position to the dispensing position.

The second preferred embodiment utilizes a similar inner and outer cylinder but with an actuating lever which moves the inner cylinder from a rest position when the indented area is aligned with the dispensing opening to compressing a spring that is located between the top of the inner cylinder and the closed top of the outer cylinder. When moved to the top position, the fill opening is aligned with the indented portion.

A third preferred embodiment utilizes a modified valve with either the first preferred embodiment or the second preferred embodiment. The modified valve has a fill-port on the upper right side of the outer cylinder and a dispense-port on the lower left side of the outer cylinder, where the interior valve has an approximately forty-five degree angled through-hole therethrough. The through-hole has interior dimensions sized to store approximately one teaspoon, one tablespoon, one cup and other selected amounts of condiments.

A fourth embodiment has a second through-holes below and parallel to a first through-hole. Moving the inner cylinder allows the contents of either one or two through-holes approximating one to two teaspoons/tablespoons to be dispensed.

The condiments that can be stored in these chambers includes but is not limited to salt, pepper, tea, coffee, cooking powders such as garlic, artificial sugar and the like.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Embodiment

Figure 1:
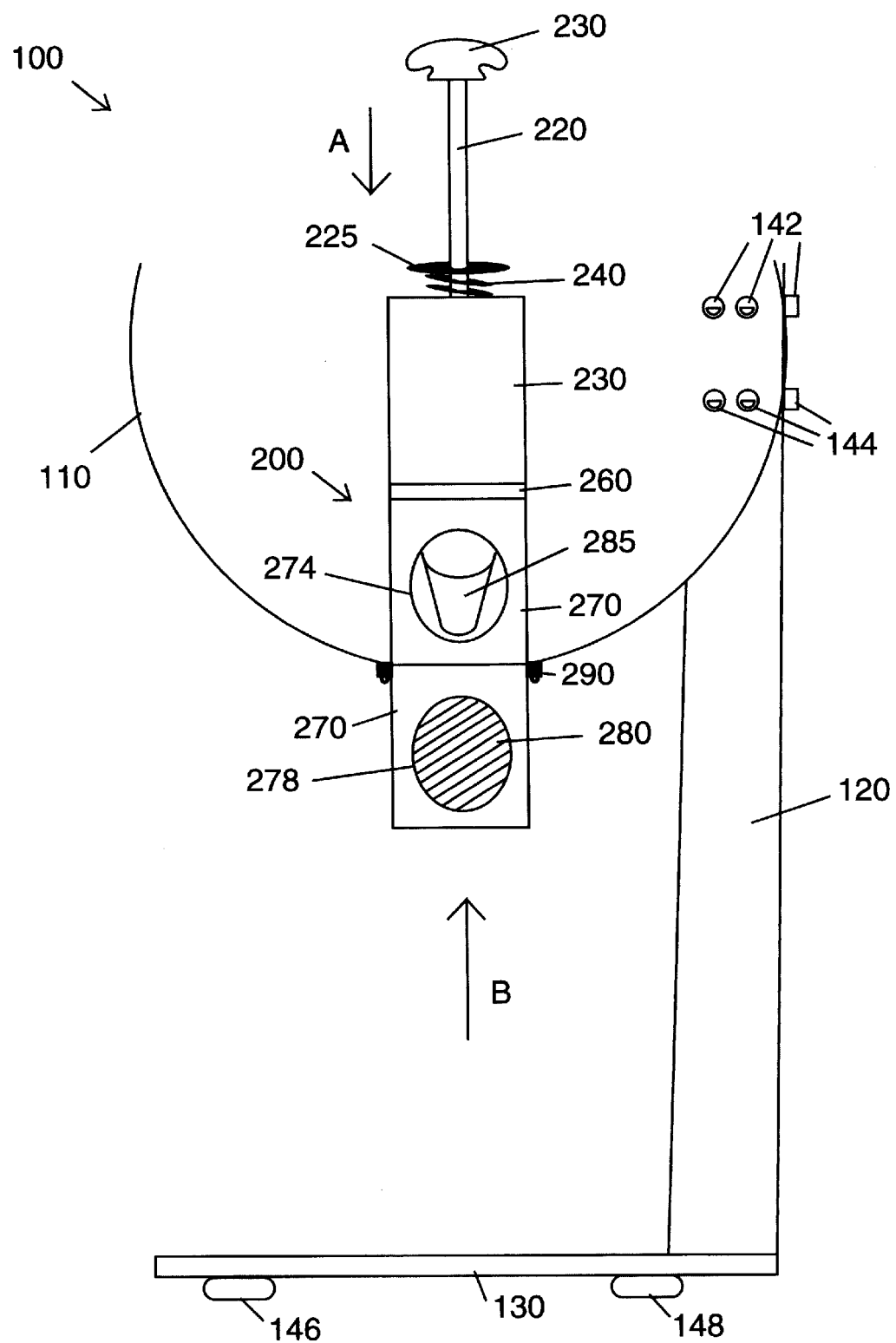
FIG. 1 shows a side view the first preferred embodiment of the invention with the push-valve in a fill position.
Figure 2:
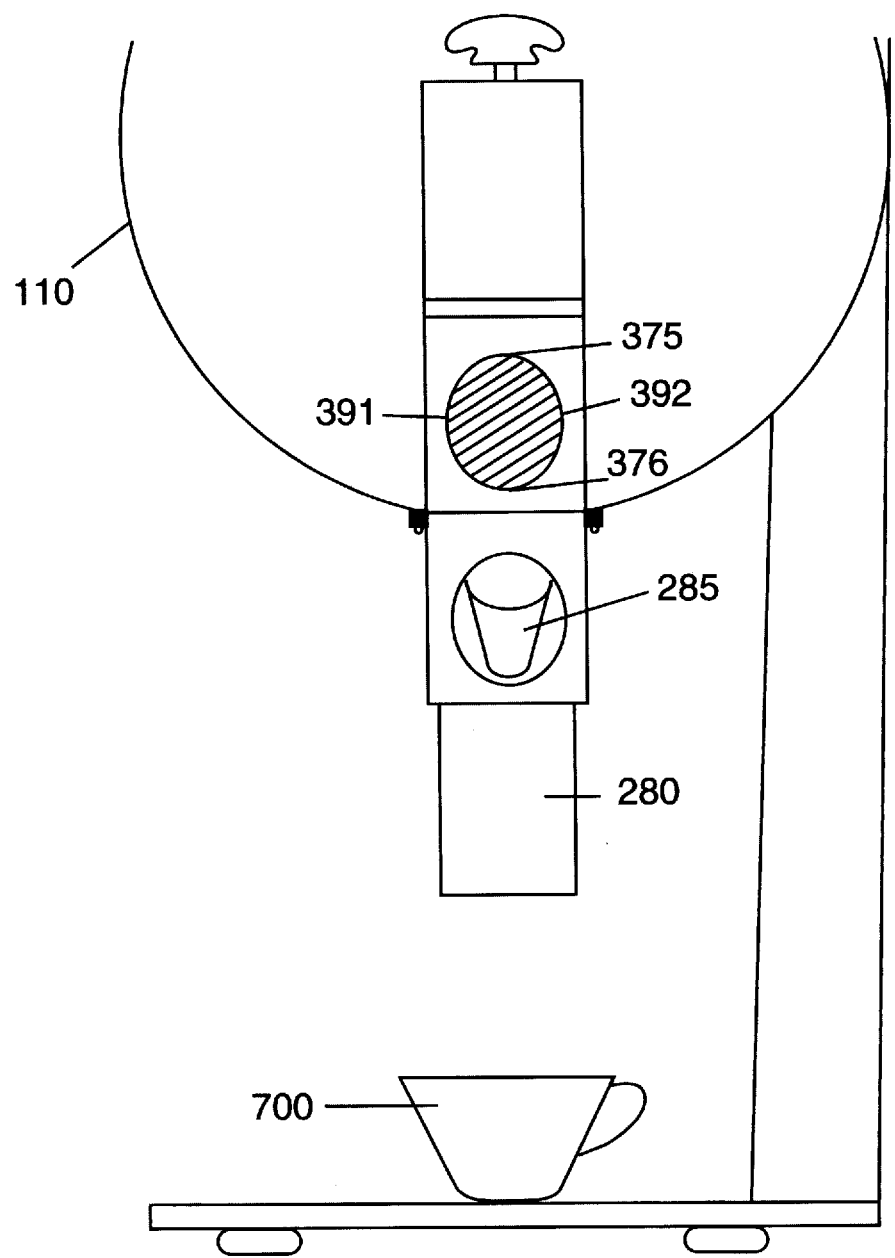
FIG. 2 shows a side view the invention of FIG. 1 in a dispensing position.

The components of this embodiment will now be described. FIG. 1 shows a side view the first preferred embodiment of the invention 100 with the push-valve 200 in a fill position. Referring to FIGS. 1 and 2, the first embodiment includes a chamber 110 in the shape of a bowl which is attached to a vertical support post 120 by fasteners such as but not limited to screws 142, nuts 144 and the like. An exemplary bowl can be approximately eight inches across the top with an approximate depth of six inches, and the vertical support post 120 having a height of approximately sixteen inches. Support post 120 can be cylindrical or have rectangular sides of between one to two inches. The lower portion of post 120 is connected to a horizontal support leg 130 connected to support post 120 by fasteners such as screws and bolts or by welding. Horizontal support post 120 can be sized to a length of approximately eight to nine inches to fit under chamber 110. Suction cups 146 and 148 can be located on the bottom side of support leg 130 for fixably securing the invention to a surface such as a table, counter or the like. A push-valve 200 is located in the bottom area of chamber 10 extending from a position within the chamber to a position beneath and exterior to the chamber 10. A Push-valve 200 is located in the bottom area of chamber 110 extending from a position within the chamber to a position beneath and exterior to the chamber 110.

Figure 3:
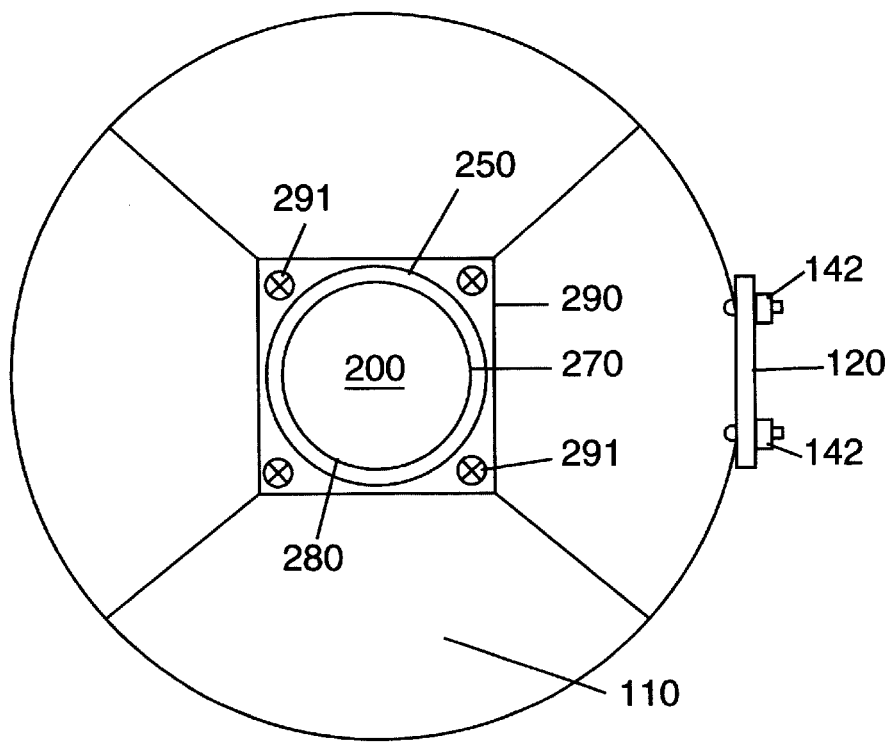
FIG. 3 shows a bottom view of the invention of FIG. 1 along arrow B.

FIG. 3 is a view along arrow B of FIG. 1. Referring to FIG. 3, push valve 200 is supported within an opening in the bottom area of chamber 110 by a mounting plate 290. Cylinder 270 can be welded or soldered at 250 to plate 290. Plate 290 can be mounted to the bottom of chamber 10 by fasteners 291 which can include screws, bolts or the like. This arrangement allows for the easy removal of push-valve 200 from chamber 110 for cleaning, servicing and the like.

Figure 4:
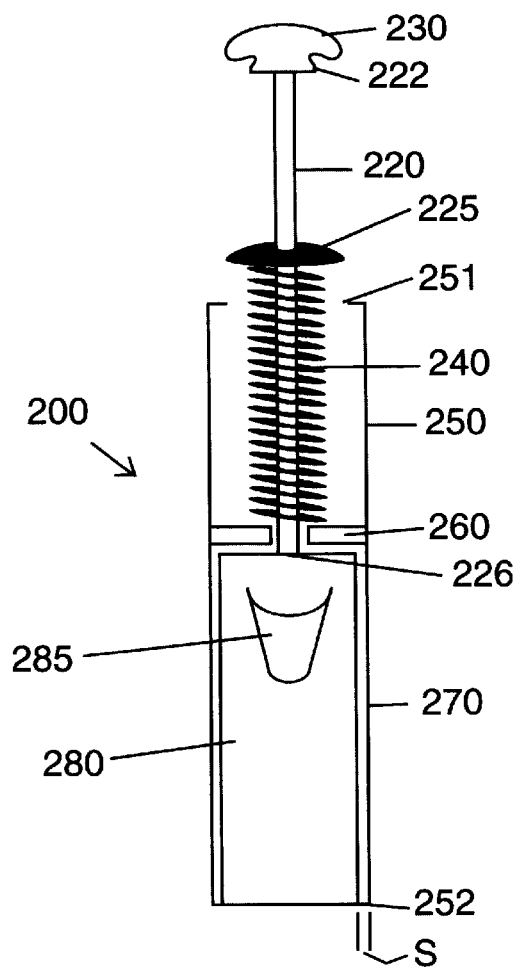
FIG. 4 illustrates a cutaway view of the push-valve of FIG. 1.

Referring to FIG. 4, push-valve 200 includes a push-button 230 connected to a top end 222 of a plunger rod 220 of approximately seven inches in length and a diameter of approximately 0.25 inches. The bottom end 226 of rod 220 is attached to the top of a solid inner cylinder 280. A 0.5 inch washer 225 is fixably welded or soldered to a mid-portion of rod 220, and a compression spring 240 is wrapped around the rod between the washer 225 and the top of a middle portion 260 of hollow outer cylinder 270 having a height of approximately 7.5 inches from point 251 to point 252 with an outside diameter of approximately one inch. Solid inner cylinder 280 is sized to fit snugly in and slidable through lower hollow outer cylinder 270 with a clearance of approximately 5/1000 of an inch. This clearance can alternatively include an approximate range of 3/1000 to 8/1000 of an inch depending on the grain sized of the condiment that is to be dispensed. Inner cylinder 280 can have a height of approximately 5.5 inches from point 226 to point 252. Upper hollow outer cylinder 250 can be approximately the same size as lower outer cylinder 270. But, middle cylinder portion 260 has a narrower diameter sized to allow rod 220 to slide therethrough. Inner cylinder 280 includes a cut-out indented area 285 that can be sized to approximate the condiment desired to be needed, such as a tablespoon or teaspoon of sugar.

Figure 6:
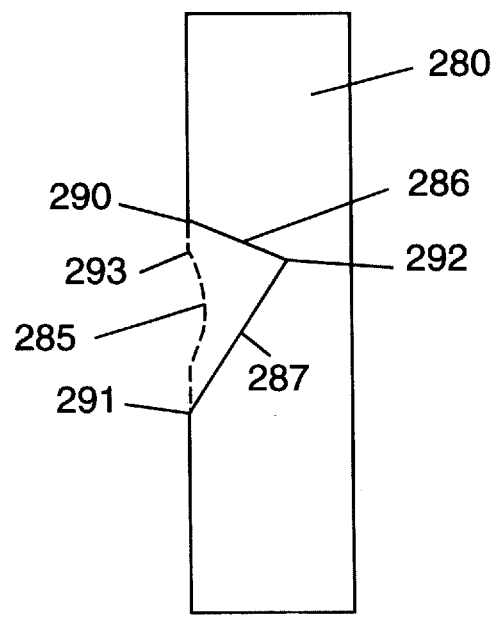
FIG. 6 illustrates a cut-away view of the indented portion of the inner cylinder used in the above Figures.

Referring to FIG. 6, inner cylinder 280 is depicted along a side view wherein cut-out indented area 285 is shown with a flat slightly sloped top surface 286 and roundly sloping side surfaces 287. Area 285 can have a height of approximately one inch from point 290 to point 291, and a depth of approximately 0.75 inches from point 293 to point 292.

Referring to FIGS. 1 and 2, outer cylinder includes a first fill opening 274 and a second dispensing opening 278 of identical oval type shapes. For example, opening 274 has dimensions of approximately one inch from point 375 to point 376 and 0.75 inch from point 391 to point 392. The chamber 110, supports 120, 130 and valve components 200 can be formed and/or machined from precut stainless steel.

The operation of the components of the first preferred embodiment will now be described.

Referring to FIG. 1, push valve 200 is depicted in an initial filling position with the first opening of outer cylinder 270 aligned with the indented cut-out portion 285 of inner cylinder 280. In this position condiments such as granular sugar stored in chamber 110 freely flows by gravity toward and into opening 285 where condiments are temporarily stored. In use push-button 230 is moved in the direction of arrow A compressing spring 240 against middle portion 260(See FIG. 4).

Referring to FIG. 2, push-button 230 has been moved downward until second hole 278 in outer cylinder 270 is aligned with indented cut-out portion 285 of inner cylinder 280 into a dispensing position which allows the stored condiment to be released into a cup 700 or the like which is positioned beneath the opening 278.

Second Embodiment

Figure 5:
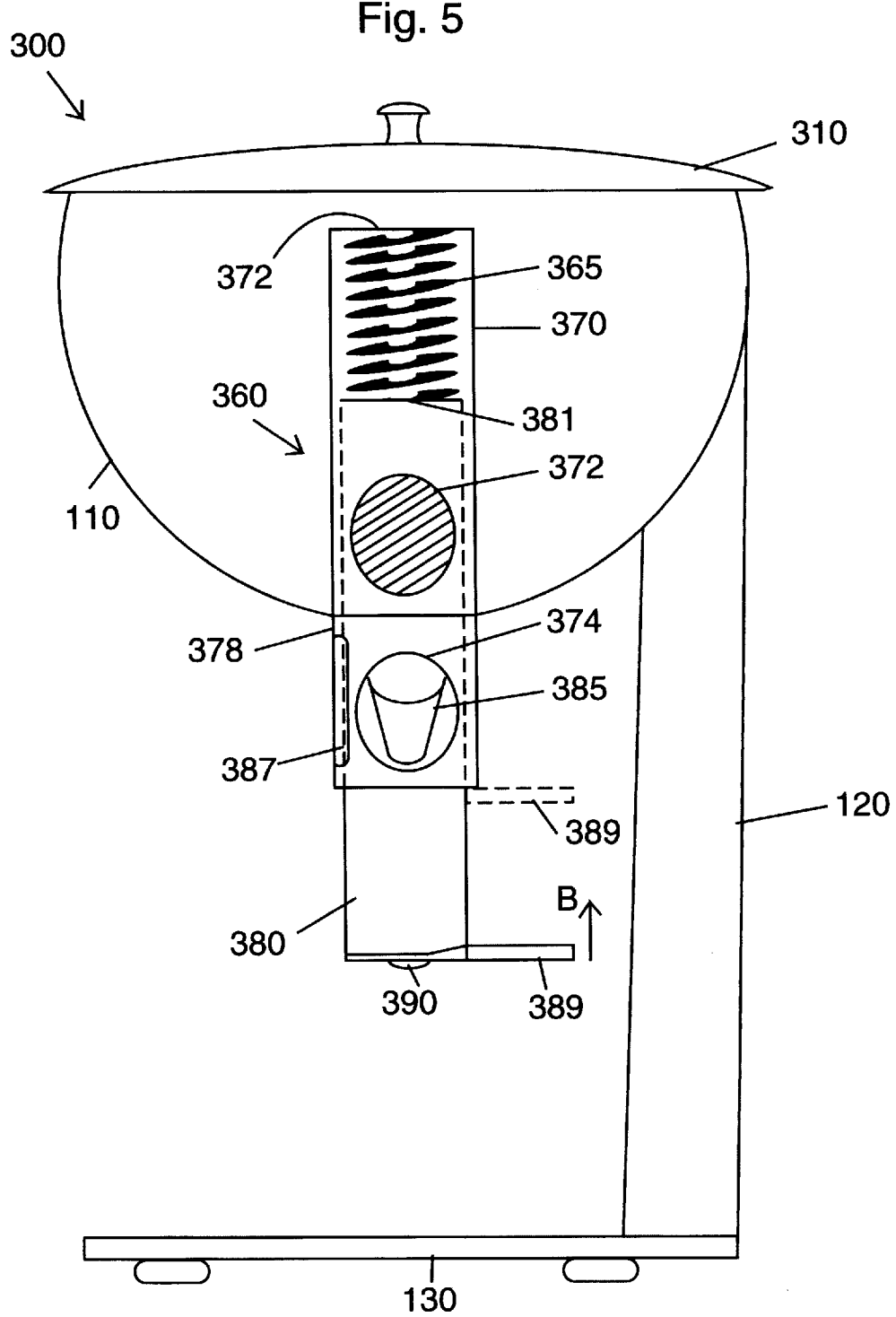
FIG. 5 shows the second preferred embodiment of the invention with the push-valve actuated by a lever arm.

FIG. 5 shows the second preferred embodiment 300 of the invention with the push-valve 360 actuated by a lever arm 389. The components of this embodiment will now be described. Similar to the first preferred embodiment, push-valve 360 is supported in the bottom of chamber 110. Optionally, a lid 310 can be used to cover the top of chamber 110. Here, hollow outer cylinder 370 has a closed top 372 for allowing a compression spring 365 to be supported against the top 381 of inner cylinder 380. Inner cylinder 380 is similar to inner cylinder 280 of the first preferred embodiment depicted in FIGS. 1 and 2.

Referring back to FIG. 5, outer cylinder includes two openings 372 and 374 which are similar to openings 274 and 278 respectively of FIGS. 1 and 2. A lever arm 389 is attached to a lower end of inner cylinder 380 by a fastener such as screw 390 or the like. The bottom of inner cylinder 380 extends beneath and exterior to outer cylinder 370 in the initial rest position. Optionally, an alignment protrusion shaft 387 can be attached to inner cylinder 380 and slide within groove 378 of outer cylinder 370.

The operation of the components of the second preferred embodiment 300 will now be described in reference to FIG. 5. During the initial fill position, lever arm 389 is moved in the direction of arrow B to the dotted lines depicted at position 389 and compresses spring 365. At the fill position opening 372 of outer cylinder 370 is aligned with indented cut-out portion 385 of inner cylinder 380 allowing condiments stored in chamber 110 to freely flow into indented cut-out portion 385. When the lever arm 389 is released, spring 365 expands pushing inner cylinder 380 until indented cut-out portion 385 is aligned with second opening 374 allowing the stored condiments to be dispensed.

Figure 7:
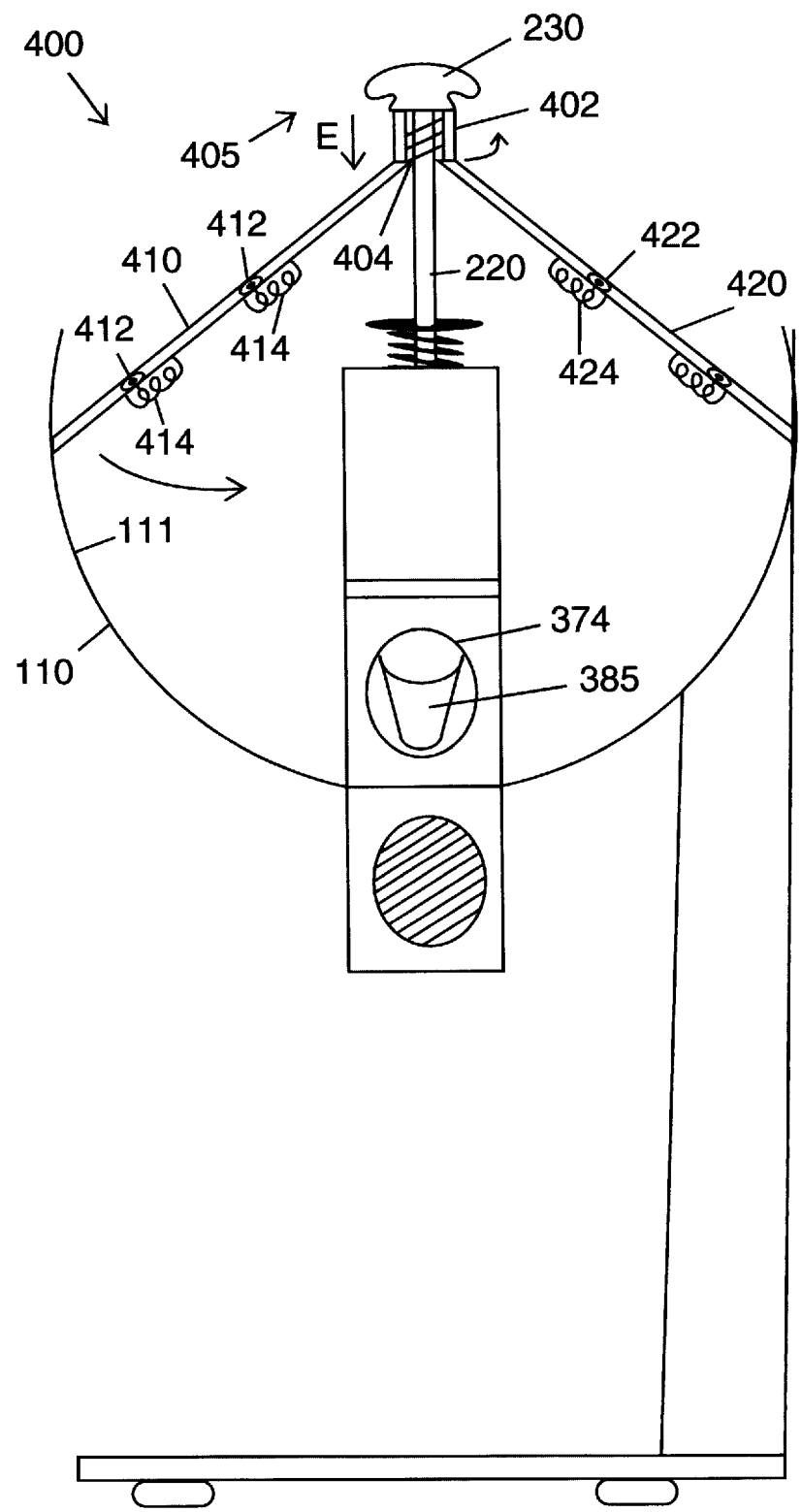
FIG. 7 illustrates an optional attachment for scraping the interior chamber walls of the invention during the operation thereof.

FIG. 7 illustrates an optional attachment arrangement 400 for scraping the interior chamber walls 111 of the above invention during the operation thereof. Attachment 405 can include a worm screw gear 404 for turning within housing 402 when push-button 230 is depressed downward. Rotating worm screw gear 404 in turn is connected to and rotates plural arms scraper arms 410 and 420 which will scrape the inner walls 111 of chamber 110 in order to move condiments toward fill hole 374. Arms 410 and 420 shown comprising plural segments connected together at hinge points 412 and 422 and can include springs 414 and 424 for keeping the arms in extended conditions to maximize the scraping action. Alternatively, the entire arms 410 and 420 can comprise flexible arms made entirely of springs. Materials for these components can include but is not limited to stainless steel, aluminum, plastic, combinations thereof and the like.

Figure 8:
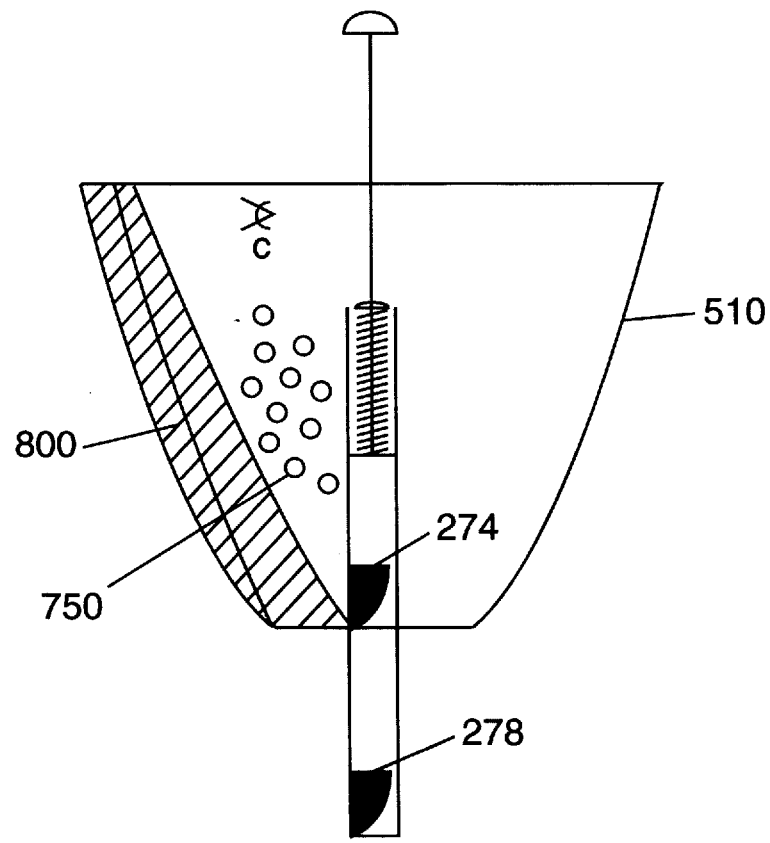
FIG. 8 illustrates an alternative chamber with sloped insert that can be used with the invention.

FIG. 8 illustrates an alternative funnel shaped chamber 510 with sloped insert 800 that can be used the invention. Sloped insert 800 increases the steepness angle C of the innerwalls. Here sloped insert 800 can be used to better direct the stored condiments 750 towards fill hole 274. The insert 800 can be formed from plastic, stainless steel, aluminum and the like.

Figure 9:
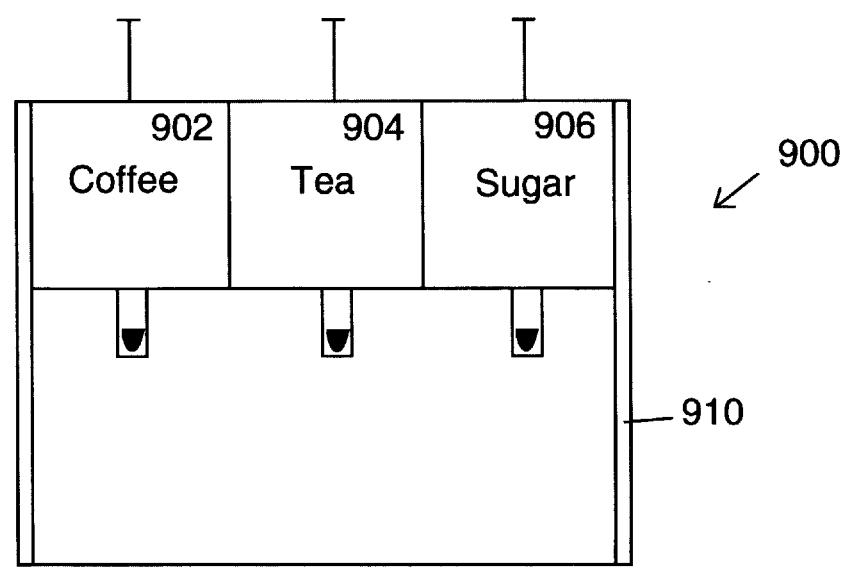
FIG. 9 illustrates an optional stand arrangement for supporting plural dispensers.

FIG. 9 illustrates an optional stand arrangement 900 for supporting plural dispensers 902, 904 and 906 in a vertical stand support 910, which can be part of a dry goods dispenser rack in a commercial store, part of a commercial or residential spice rack, or the like.

Third Embodiment

Figures 10A, 10B:
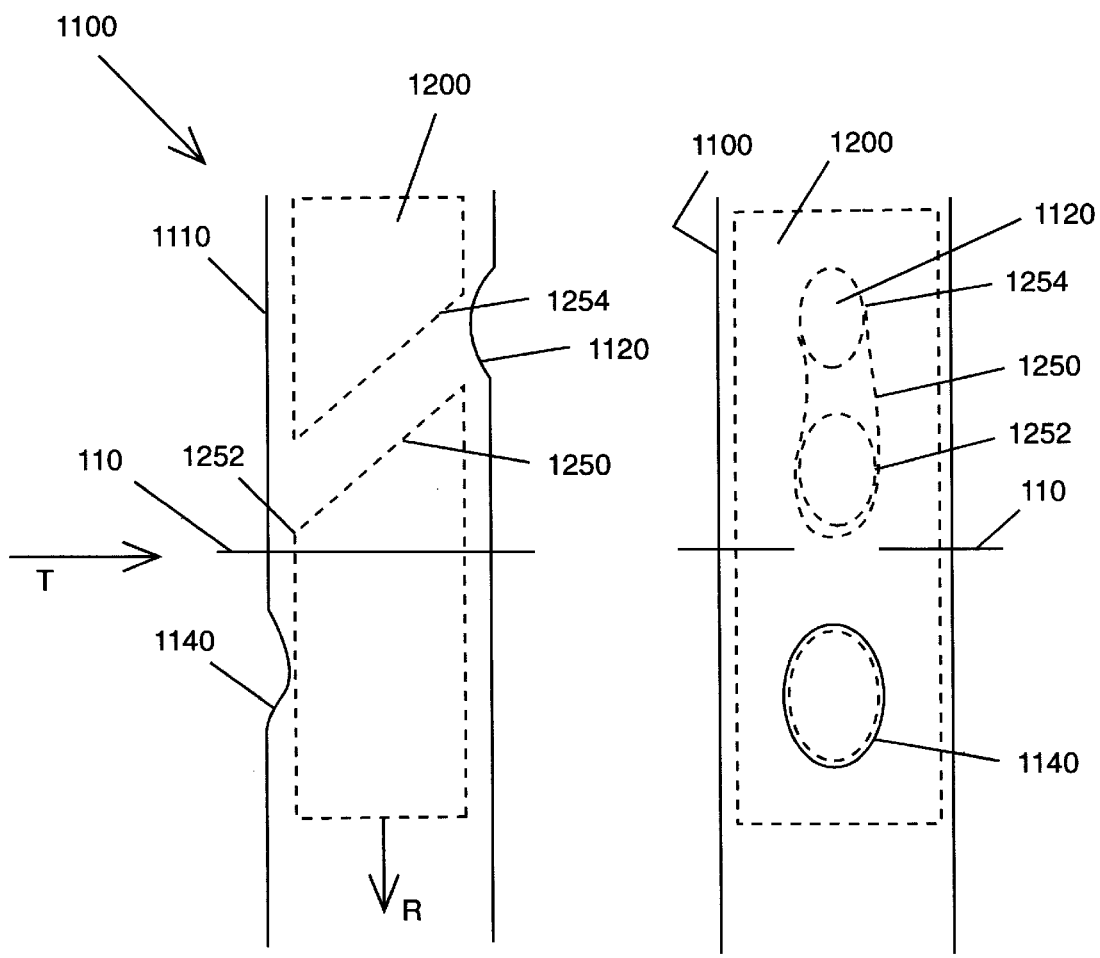
FIG. 10A is a cross-sectional view of a third embodiment plunger valve assembly for use with the chamber of FIGS. 1, 3, 5, 7–8, 9.
FIG. 10B is a side view of the embodiment of FIG. 10A along arrow T.

FIG. 10A is a cross-sectional view of a third embodiment plunger valve assembly 1100 for use with the chambers 110 of FIGS. 1, 3, 5, 7–8, 9. FIG. 10B is a side view of the embodiment 1100 of FIG. 10A along arrow T. Referring to FIGS. 10A–10B, plunger valve assembly 1100 includes an exterior cylinder 1110 and interior cylinder 1200 which can be substituted for the exterior and interior cylinders 270, 280 and 370, 380 of the preceding embodiments respectively. Exterior hollow cylinder 1110 includes a fill opening 1120 on one upper end side of the cylinder 1110 within the chamber 110 and a dispense opening 1140 on a lower end side of the cylinder 1110. Slidable interior solid cylinder 1200 moves in the direction of arrow R and includes a through-hole 1250 with a lower end dispense opening 1252 and an upper fill opening 1254.

Through-hole 1250 has an angle of approximately forty-five degrees to the axis of the inner cylinder 1200 and can be sized to be filled with a teaspoon or tablespoon of condiments. When interior cylinder 1200 is moved down in the direction of arrow R, through-hole opening 1254 is first aligned with fill opening 1120 allowing condiments in chamber 110 to fill through-hole 1250. Continuing to move inner cylinder 1200 in the direction of arrow R causes the condiment contents of through-hole 1250 to pass outside when through-hole opening 1252 becomes aligned with dispense opening 1140.

Fourth Embodiment

Figure 11A:
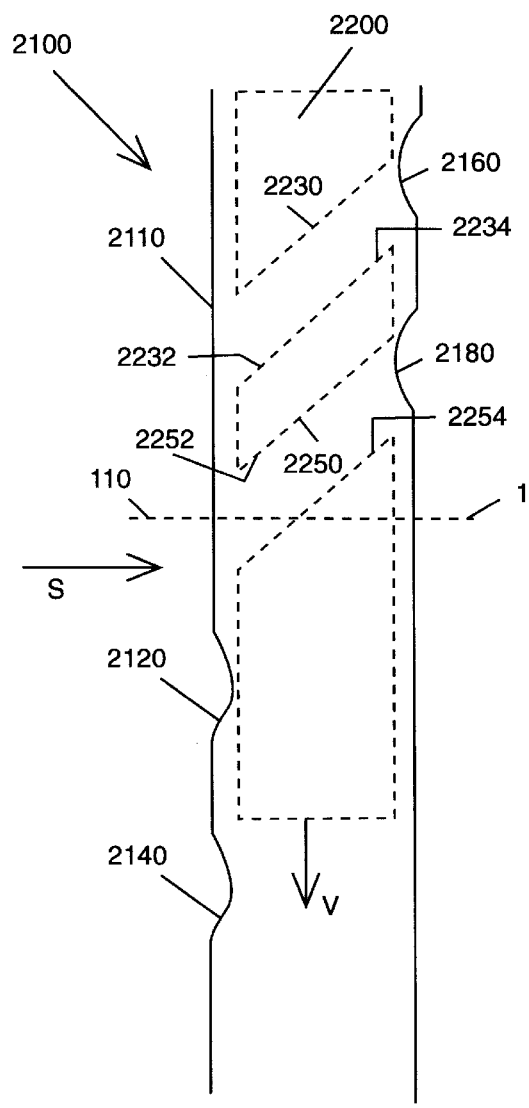
FIG. 11 A is a cross-sectional view of a fourth embodiment plunger valve assembly for use with the chambers of FIGS. 1, 3, 5, 7–8, 9.
FIG. 11B is a side view of the embodiment of FIG. 11A along arrow S.
Figure 11B:
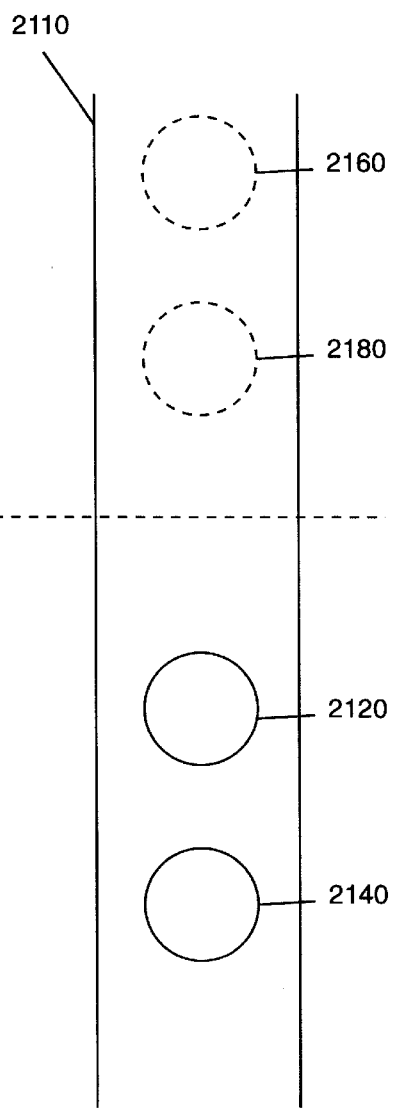

FIG. 11A is a cross-sectional view of a fourth embodiment plunger valve assembly 2100 for use with the chambers 110 of FIGS. 1, 3, 5, 7–8, 9. FIG. 11B is a side view of the exterior valve 2110 of FIG. 11A along arrow S. Referring to FIGS. 11A–11B, plunger valve assembly 2100 includes an exterior cylinder 2110 and interior cylinder 2200 which can be substituted for the exterior and interior cylinders 270, 280 and 370, 380 of the preceding embodiments respectively. Exterior hollow cylinder 2110 includes a first fill opening 2160 above a second fill opening 2180 on one upper end side of the cylinder 2110 within the condiment chamber 110 and first dispense opening 2120 and second dispense opening 2140 on a lower end side of the cylinder 2110. Slidable interior solid cylinder 2200 moves in the direction of arrow R and includes two parallel through-holes 2230, 2250 with a lower end dispense openings 2232, 2252 and upper fill openings 2234, 2254, respectively. Through-holes 2230, 2250 are angled approximately forty-five degrees to the axis of the inner cylinder 2200 and each can be sized to be filled with a teaspoon or tablespoon of condiments. When interior cylinder 2200 is moved down in the direction of arrow V, through-hole openings 2234 and 2254 are first aligned with fill openings 2160 and 2180 allowing condiments in chamber 110 to fill through-holes 2230 and 2250. Continuing to move inner cylinder 2200 in the direction of arrow V causes the condiment contents of through-holes 2230 and 2250 to pass outside when through-hole openings 2232 and 2252 become aligned with dispense openings 2120 and 2140, respectively.

While the embodiments have been described as being composed up stainless steel, the components can be manufactured from other materials such as but not limited to aluminum, plastics, fiberglass, combinations thereof, and the like. Further, portions of components such as the lid and the chamber can include transparent areas for allowing the user to refill the chamber when desired.

While the preferred embodiments have been described for dispensing sugar, the invention can be used to dispense other types of condiments and food powders such as but not limited to salt, pepper, tea, coffee, cooking powders such as garlic, artificial sugar and the like.

While the preferred embodiments have been described for dispensing granular type materials, the invention can be readily modified to dispense liquids such as but not limited to ketchup, mustard, milk, cream, juice additives such as lemon juice and the like. The modification can include O-type-rings within and between the inner and outer cylinders.

Although the embodiments describe a teaspoon, and tablespoon of condiments can be dispensed, the invention can work with dispensing up to a cup or more of condiments.

The invention can further be formed from chrome plated plastic and chrome plated steel.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for dispensing preselected amounts of condiments comprising:

a chamber for storing a condiment having a granular size, the chamber having sides and a bottom; and a push valve located in the bottom of the chamber, for filling and dispensing the condiment, the push valve having, an inner cylinder for sliding within an outer cylinder and a clearance therebetween, the clearance being smaller than the granular size, the outer cylinder having an upper portion with a first opening and a lower portion with a second opening, the upper portion extending into the chamber, the lower portion extending beneath and exterior to the chamber, the inner cylinder having an angled first through-hole with an entry port for receiving condiments when the entry port is aligned with the first opening, the first through-hole having an exit port for releasing the condiments when the exit port is aligned with the second opening.

2. The apparatus of claim 1, wherein the first through-hole further includes:

a forty-five degree angle to the axis of the inner cylinder.

3. The apparatus of claim 1, wherein the first through-hole includes:

storage for a teaspoon of condiments.

4. The apparatus of claim 1, wherein the first through-hole includes:

storage for a tablespoon of condiments.

5. The apparatus of claim 1, wherein the first through-hole includes:

storage for a cup of condiments.

6. The apparatus of claim 1, the push valve further including:

a plunger rod connected at one end to a press button and at a second end to the inner cylinder; and a spring wrapped around the plunger rod wherein depressing the press button compresses the spring and releasing the button allows the spring to return the inner cylinder to the fill position.

7. The apparatus of claim 1, the push valve further including:

a lever arm for moving the valve upwardly to a fill position and releasing the arm allowing the valve to move to a dispensing position.

8. The apparatus of claim 1, the push valve further including:

a lever arm attached to one end of the inner cylinder and an expansion spring positioned between a second end of the inner cylinder, wherein pushing up the lever arm compresses the spring and moves the valve to the fill position, and releasing the lever arm allows the spring to expand which moves the valve to the dispensing position.

9. The apparatus of claim 1, wherein the condiment further includes:

granular sugar.

10. The apparatus of claim 1, wherein the condiment is selected from at least one of:

salt, pepper, garlic and spices.

11. The apparatus of claim 1, wherein the condiment is selected from at least one of:

tea, coffee.

12. The apparatus of claim 1, wherein the chamber and valve are formed from at least one of:

plastic, aluminum, stainless steel and chrome plate.

13. The apparatus of claim 1, further comprising:

plural chambers each with respective push valves and supported within a dispensing stand.

14. The apparatus of claim 1, further comprising:

a third opening in the upper portion of the outer cylinder beneath the first opening;

a fourth opening in the lower portion of the outer cylinder beneath the second opening;

a second angled through-hole in the inner cylinder parallel to and beneath the first angled through-hole, the second angled through-hole having a second entry port for receiving condiments when aligned with the third opening, the second through-hole having a second exit port for releasing condiments when the exit port is aligned with the fourth opening.

15. The apparatus of claim 14, wherein the first angled through-hole and the second angled through-hole each further includes:

a forty-five degree angle to the axis of the inner cylinder.

16. The apparatus of claim 14, wherein at least one of the first angled through-hole and the second angled through-hole includes:

storage for a teaspoon of condiments.

17. The apparatus of claim 14, wherein at least one of the first angled through-hole and the second angled through-hole includes:

storage for a tablespoon of condiments.

18. The apparatus of claim 14, wherein at least one of the first angled through-hole and the second angled through-hole includes:

storage for a cup of condiments.

19. An apparatus for dispensing preselected amounts of condiments comprising:

a chamber for storing condiments, the chamber having sides and a bottom; and a push valve located in the bottom of the chamber, for filling and dispensing the condiment, the push valve having an inner cylinder for sliding within an outer cylinder, the outer cylinder having an upper portion with a first opening and a lower portion with a second opening, the upper portion extending into the chamber, the lower portion extending beneath and exterior to the chamber, the inner cylinder having a downwardly angled first through-hole with an entry port for receiving a selected amount of the condiments when the entry port is aligned with the first opening, the first through-hole having an exit port for releasing the selected amount of the condiments when the exit port is aligned with the second opening.

* * * * *